United States Patent
Yamazaki (10) Patent No.: US 8,725,846 B2
(45) Date of Patent: May 13, 2014

(54) NETWORK SYSTEM, TERMINAL CUSTOMIZATION METHOD, AND CUSTOMIZATION SERVICE METHOD

(75) Inventor: Kinya Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1195 days.

(21) Appl. No.: 12/040,665

(22) Filed: Feb. 29, 2008

(65) Prior Publication Data

US 2008/0294744 A1 Nov. 27, 2008

(30) Foreign Application Priority Data

Mar. 30, 2007 (JP) ................................. 2007-093441

(51) Int. Cl.
| | | |
|---|---|---|
| *G06F 15/177* | (2006.01) | |
| *H04M 3/00* | (2006.01) | |
| *H04M 1/725* | (2006.01) | |
| *H04W 8/24* | (2009.01) | |
| *H04M 3/42* | (2006.01) | |
| *H04L 12/24* | (2006.01) | |
| *H04M 15/00* | (2006.01) | |

(52) U.S. Cl.
CPC ...... *H04M 1/72525* (2013.01); *H04M 1/72563* (2013.01); *H04W 8/245* (2013.01); *H04M 3/42153* (2013.01); *H04M 1/72533* (2013.01); *H04L 41/0879* (2013.01); *H04M 15/745* (2013.01)
USPC ............................. 709/220; 709/222; 455/418

(58) Field of Classification Search
CPC ..................... H04M 1/72525; H04M 1/72563; H04M 1/72533; H04M 3/42153; H04M 15/745; H04M 2215/0168; H04W 8/245; H04L 41/0879
USPC ................... 709/207, 220, 222; 455/418, 419
See application file for complete search history.

(56) References Cited

U.S. PATENT DOCUMENTS

| | | | |
|---|---|---|---|
| 6,950,660 B1 * | 9/2005 | Hsu et al. .................... | 455/456.1 |
| 7,260,382 B1 * | 8/2007 | Lamb et al. ................... | 455/411 |
| 7,634,565 B2 * | 12/2009 | Goffin ........................... | 709/225 |
| 2004/0203941 A1 * | 10/2004 | Kaplan et al. ................. | 455/466 |
| 2004/0266417 A1 * | 12/2004 | Janas ............................ | 455/419 |
| 2005/0159139 A1 * | 7/2005 | Benco et al. ............... | 455/414.1 |
| 2005/0164691 A1 | 7/2005 | Payne | |
| 2005/0164692 A1 | 7/2005 | Roth et al. | |

FOREIGN PATENT DOCUMENTS

| | | |
|---|---|---|
| JP | 2002-232343 A | 8/2002 |
| WO | WO 2005/053264 A1 | 6/2005 |

OTHER PUBLICATIONS

Communication dated Aug. 18, 2008; Extended European Search Report in the corresponding European Patent Application No. 08003784.9-2412.

Japanese Office Action mailed Oct. 11, 2011 for corresponding Japanese Application No. 2007-093441, with Partial English-language Translation.

* cited by examiner

*Primary Examiner* — Brian J Gillis
(74) *Attorney, Agent, or Firm* — Fujitsu Patent Center (57) ABSTRACT

A first terminal notifies an LFC service functional unit of LFC package related information for customization of a second terminal, an address of the second terminal to be customized, and an account of the user of the first terminal to a contents provider. As a result, the LFC service functional unit acquires an LFC package from the contents provider, then the LFC service functional unit customizes the second terminal based on the obtained LFC package.

12 Claims, 10 Drawing Sheets

FIG.9
RELATED ART

NETWORK SYSTEM, TERMINAL CUSTOMIZATION METHOD, AND CUSTOMIZATION SERVICE METHOD

BACKGROUND OF THE INVENTION

1. Field of the Invention

The present invention relates to a network system, more particularly relates to a network system providing a customization service for terminals, a terminal customization method, and a customization service method.

2. Description of the Related Art

In mobile phones, smartphones, personal data assistants (PDA), handheld PCs, and other mobile terminals, the screens of the mobile terminals or the user interfaces of applications running on the mobile terminals have been customized to match with user preferences or to improve operability. Furthermore, services providing contents for customization or functions for customization free or charge or on a fee-basis have been increasing as well.

Services for customization are services where the users, contents providers, carriers, etc. provide contents and functions for customization such as appearances, operability, and sounds of terminals or applications operating on the terminals. Such services are called "LFC (Look and Feel Customization) services".

Figure 9:
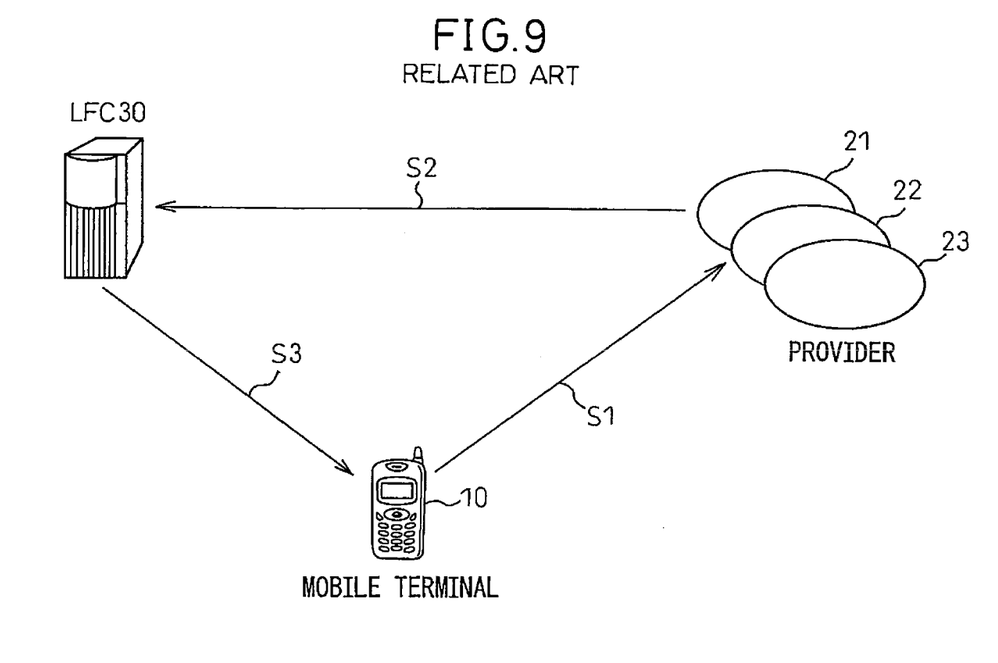
FIG. 9 is a view for explaining the related art.
Figure 10:
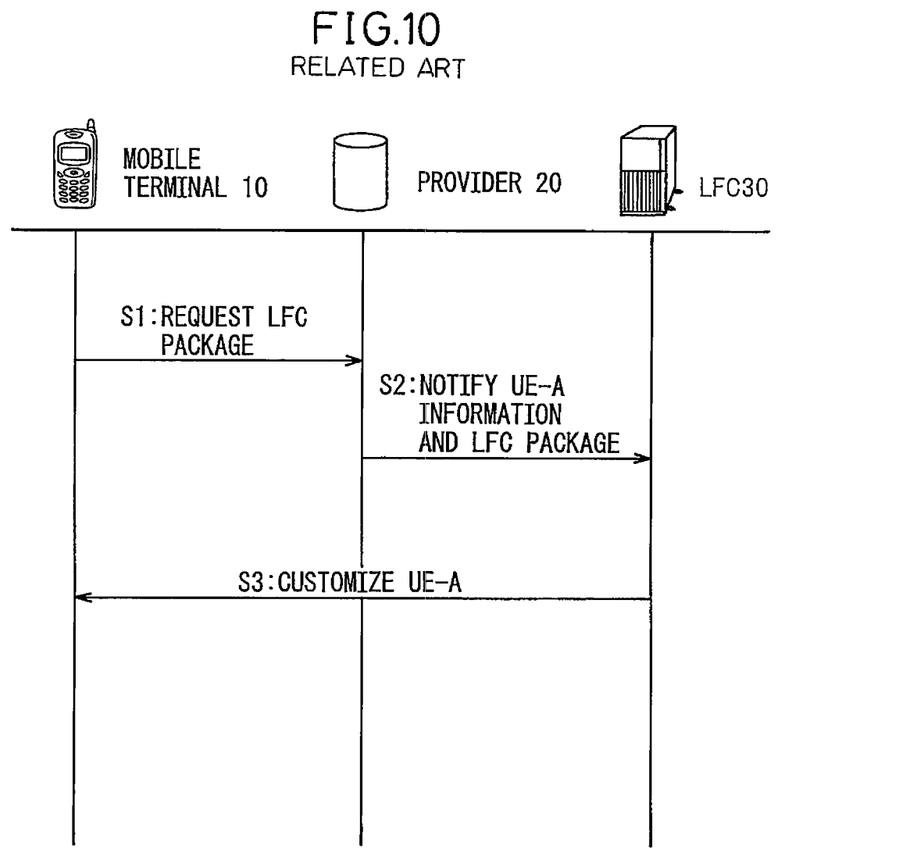
FIG. 10 is a view for explaining the flow of operation of the related art.

FIGS. 9 and 10 are views for explaining the conventional LFC service provided on a network. FIG. 9 shows a network performing a conventional LFC service. The network of FIG. 9 includes a mobile terminal 10 owned by a user, contents providers 21 to 23 each selling contents data for customization of terminals as LFC packages, and an LFC service functional unit 30 customizing mobile terminals. Each LFC package stores files including contents data for customization, such as a file of wallpaper or a file of ring alerts.

FIG. 10 is a view showing the flow of operation of the conventional LFC service of FIG. 9. At step S1, a user trying to customize his own mobile terminal 10 sends account information of the user including the ID or password, and unique address information for identifying the mobile terminal 10 on the network to the contents provider 20, and requests the purchase of the LFC package in which the contents for customization are contained.

At step 2, the contents provider 20 acknowledges the purchase request of the user. The contents provider 20 then notifies the user information identifying the mobile terminal 10 and the LFC package purchased by the user to the LFC service functional unit 30.

The LFC service functional unit 30 performs command operations of the mobile terminal 10 to customize the mobile terminal, for example, change the background image or ring alert, based on information sent from the contents provider 20. The conventional service is the service that an individual user customizes own terminal. However, the conventional services do not envision a user customizing a terminal owned by another user. It was not possible for a user to customize a terminal owned by another user. Note that no publication relating to customization of a terminal owned by another user can be found.

SUMMARY OF THE INVENTION

An object is to provide a network realizing a customization service, a terminal customization method, and a customization service method able to use a request of a user of any terminal to customize a terminal owned by another user.

To achieve the above object, a network system comprises a plurality of terminals, a contents management server managing contents for customization of the terminals, and a customization service unit customizing at least one of said terminals based on the contents for customization notified from the contents management server, wherein any terminal among said plurality of terminals notifies any of the other terminals and said customization service unit of a related information designating the contents for customization for customizing the other terminal, and requests customization of said other terminal.

Further, a terminal customization method in a network system that comprises a plurality of terminals, a contents management server managing contents for customization of said terminals, and a customization service unit customizing at least one of said terminals based on contents for customization notified from said contents management server, the terminal customization method comprises requesting, from any of the terminals, a customization of any of the other terminals, by notifying any of the other terminals or the customization service unit of a related information designating customization contents; obtaining, by the other terminal or the customization service unit the contents for customization designated by the related information by accessing the contents management server; and customizing the other terminal by the customization service unit based on the contents for customization obtained from the contents management server.

A customization service apparatus performing a customization service of a terminal connected to a network based on contents for customization comprises a terminal agent functional unit functioning as an agent of a terminal of a user requesting a customization of the other terminal, the terminal agent functional unit receives from the terminal of a requesting user requesting customization of a terminal, a related information designating the contents for customization, terminal information identifying the other terminal to be customized, and account information of the requesting user that is permitted to acquire the contents for customization.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, some embodiments will be explained with reference to FIGS. 1 to 8.

Figure 1:
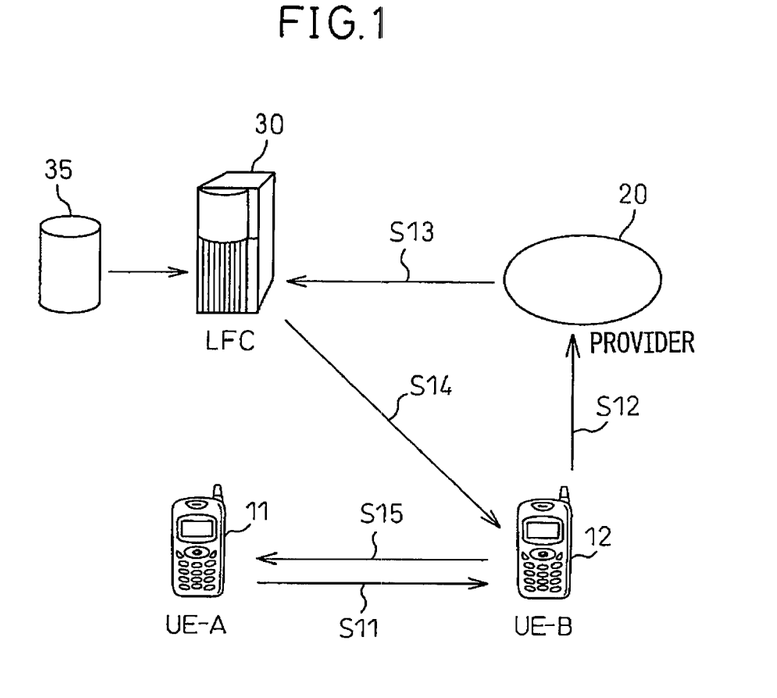
FIG. 1 is a view explaining a first embodiment of the present invention.
Figure 2:
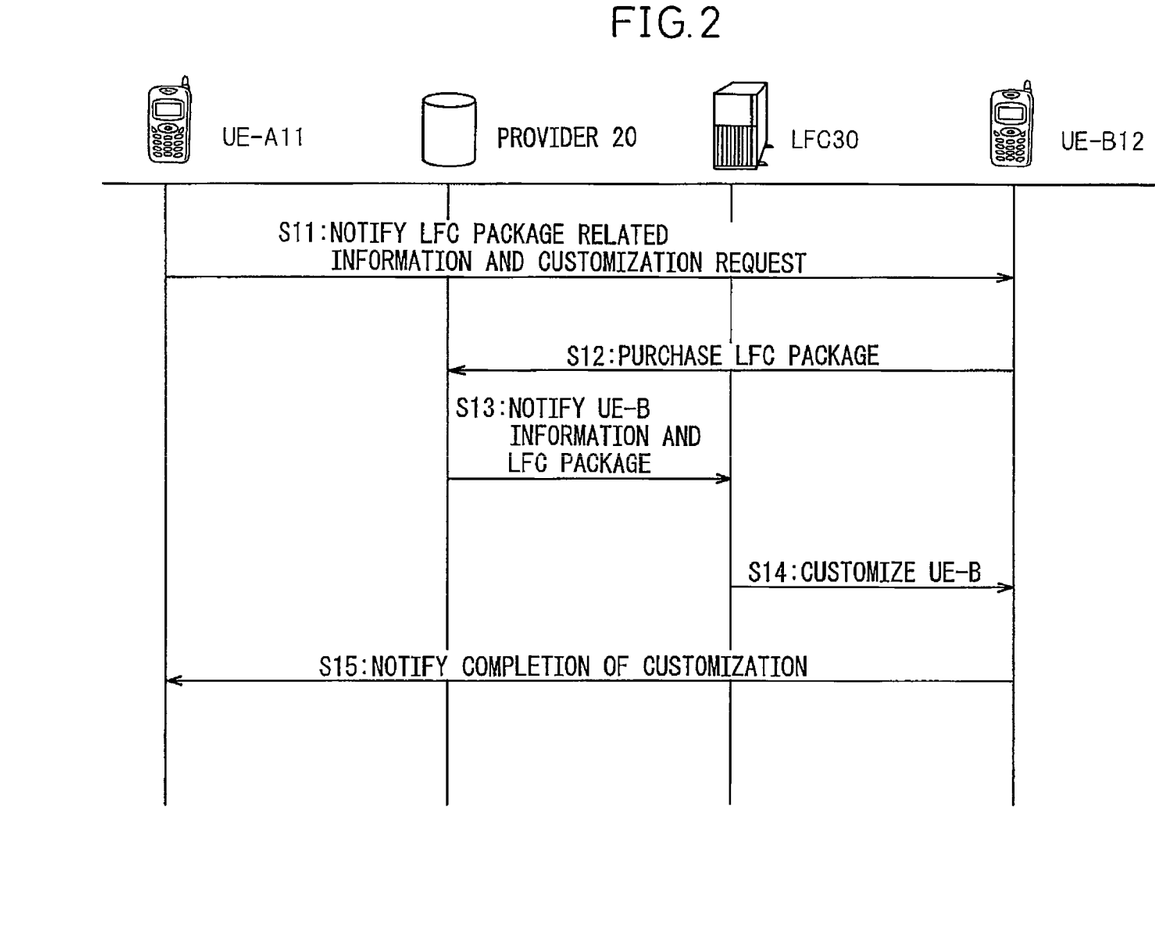
FIG. 2 is a view explaining the flow of operation of the first embodiment of the present invention.

FIG. 1 is a view explaining an embodiment of a customizing system. FIG. 2 is a view explaining the flow of operation of the system shown in FIG. 1. In FIGS. 1 and 2, the example of customizing a single terminal is explained in order to facilitate the explanation, but it is also possible to customize a plurality of terminals in a similar manner as to customize a single terminal.

The embodiment shown in FIGS. 1 and 2 is an example where any user can customize a terminal of another user. The system notifies the contents for customization, that is, the LFC package related information designating the LFC package, to the terminal of the other user so as to make the other terminal acquire the LFC package.

FIG. 1 shows a terminal UE-A11 owned by one user, a terminal UE-B12 owned by another user, a contents provider 20 selling contents data for customization of a terminal as an LFC package, and an LFC service functional unit 30 customizing a terminal based on an LFC package notified from the contents provider 20. The contents provider 20 is an example of a contents management server managing contents for customization, while the LFC service functional unit 30 is an example of a customization service unit.

The customization of a terminal includes customization of the background of the screen, the language used, the tone for notifying an incoming call, the sound for notifying an incoming call, the fonts used, the menus, bookmarks, setting of a soft keyboard allocated functions, settings of shortcuts for keyboard operation, and customization of the other various functions or settings of the terminal. The customization further includes, for example, installation of JAVA® script and installation of other applications etc.

An LFC package stores files of data for customization of terminals. The files stored in an LFC package may be a single type of files or pluralities of types of files as sets. As one example, an LFC package may store a file for wallpaper, a file for incoming call sounds, a file for short key settings, an application file, and a JPEG file showing the brand logo.

The contents provider 20 may be a contents server providing contents for customization, instead of a provider selling contents for customization. For example, the contents provider 20 may be a contents server connected to an inhouse network. Contents for installation of applications for teleconferences that are designed to enable required personnel to install such applications, or contents for changing settings for overcoming firewalls are some examples of the contents for customization stored in a contents server that is connected to an inhouse server.

The LFC package may be held in the contents provider 20, but it is also possible to provide another external server 35 separate from the contents provider 20, and have the LFC service functional unit 30 acquire the LFC package from the external server 35 based on the LFC package acquisition information for acquiring the LFC package notified from the contents provider 20.

The LFC service functional unit 30 is described as a unit separate from the contents provider 20 for facilitating the explanation, but may be integral with the contents provider 20, or be a part of the contents provider 20. The LFC service functional unit 30 and the contents provider 20 may be physically separated or integrated, or may be the same or different in operating entity so long as there is a logical relation of trust.

When the customization of the terminal ends, the contents data included in the LFC package is stored in the memory of the terminal, so the user can further customize the terminal by using such stored LFC package.

FIG. 2 shows the flow of operation of the system shown in FIG. 1, FIG. 2 shows the flow of operation in the case where the user of the terminal UE-A11 customizes the other terminal UE-B12. The terminal UE-B12 may be owned by the same user or by a different user.

At step S11, the user of the terminal UE-A11 requests customization of the terminal UE-B12 from the terminal UE-A11 to the terminal UE-B12. The terminal UE-A11 sends customization request contains the customization request message, unique address information identifying the user making the request, and other LFC package related information relating to the LFC package for customization of the terminal UE-B12. The unique address information includes information such as the terminal telephone number, SIP-URL (Session Initiation Protocol-Uniform Resource Locator), and unique address of the LFC service. The LFC package related information includes the URL and/or name of the contents provider selling the LFC package or the contents server 20 managing the LFC package, the LFC package identifier, or other information enabling identification and acquisition of the data required for customization.

The customization request may be sent by any method. For example, the customization request may be sent by email or IM (Instant Messenger). The terminal UE-B12 receiving the customization request from the user of the terminal UE-A11 may display information that the terminal UE-B12 received the customization request on the screen.

At step S12, the terminal UE-B12 receiving the customization request sends to the contents provider 20 the ID and password and other account information of the user of the terminal UE-B12, the LFC package identifier for identifying the LFC package notified from the terminal UE-A11, for example, the name or number of the LFC package, and unique address information for identifying the terminal UE-B12 on the network. The terminal UE-B12 then purchases the LFC package for acquisition notified from the terminal UE-A11.

The account information of the terminal UE-B12 to be sent to the contents provider 20 may be input by the user of the terminal UE-B12, or may be automatically sent whenever a customization request occurs without bothering the user of the terminal UE-B12. When the account information of the user of the terminal UE-B and the address information for identifying the terminal UE-B are registered and managed in advance in the contents provider 20, there is no need to notify the address information of the terminal UE-B to the contents provider, if the user of the terminal UE-B notifies the contents provider the account information of the user. However, if the account information of the user of the terminal does not match the address information of the terminal one to one, in a case such as a single user owns several terminals for example, it is necessary to send unique address information of the terminal to the contents provider.

Next, at step S13, the contents provider 20 notifies the purchased LFC package and the address information of the terminal UE-B of the purchasing user to the LFC service functional unit 30.

When the contents provider 20 does not hold the LFC package to be sold, but has placed the LFC package at an external server 35 in a relation of trust with the contents provider 20, the contents provider 20 does not send the LFC service functional unit 30 the LFC package, but notifies the LFC package acquisition information. The LFC service functional unit 30 notified of the LFC package acquisition information downloads the LFC package purchased by the terminal UE-B12 from the external server 35.

At step S14, the LFC service functional unit 30 sends commands to the terminal UE-B21 for customization based on the LFC package acquired from the contents provider 20 or external server 35 to customize the terminal UE-B21. The commands sent by the LFC service functional unit 30 may include, for example, "Install" command for installing application, "Query" command for making inquiries, "Delete" command for deletions, or "Change" command for making changes to the terminal.

As shown in step S15, when the customization of the terminal UE-B12 is completed, the terminal UE-B12 sends to the terminal UE-A11 a notification of completion of customization.

Note that the LFC contents are stored in the terminal UE-B12 for customization. So even if the terminal UE-B12 returned to the state before customization after the customization is processed, or the other customization is applied to the same terminal, the customization can be repeated by using the LFC contents stored in the terminal UE-B12.

According to the embodiment described above, any user can customize the terminal owned by another user, or the other terminal owned by the same user. In particular, the customization of the terminal described above is useful when desiring to customize a plurality of terminals to similar screens or functions. That is, there is no need for a user to individually customize each of own terminals. It is possible to customize all of the terminals to be customized, by sending a customization request from one terminal to the other terminals.

However, in the embodiment described above, it might not be possible to customize terminals as instructed by the terminal UE-A11 requesting the customization request in the cases of the following (P1) to (P4).

(P1) Sometimes it is unclear if the terminal UE-B12 is a subscriber to the contents provider 20 designated by the terminal UE-A11. If the terminal UE-B12 is not a subscriber to the contents provider 20, the terminal UE-B12 cannot purchase the LFC package designated by the terminal UE-A11 from the contents provider 20.

(P2) The terminal UE-B12 purchases the LFC package based on the request for customization of the terminal UE-A11, so the terminal UE-B12 will be charged. Therefore, the user of the terminal UE-B12 might refuse the customization of own terminal.

(P3) When the contents provider 20 is a contents server connected to an inhouse network, the terminal UE-A11 and the terminal UE-B12 do not necessarily mount same functions. The terminal UE-A11 may not know the functions which the terminal UE-B12 mounts. Even if the terminal UE-A11 notifies the terminal UE-B12 of the LFC package related information, the terminal UE-B12 sometimes will not be able to overcome the firewall in the inhouse network and will not be able to access the contents server.

(P4) When the contents provider 20 is a contents server connected to an inhouse network, even if the terminal UE-B12 can overcome a firewall, the terminal UE-B12 cannot access the contents server unless the terminal UE-B12 has the right of access to the contents server.

Figure 3:
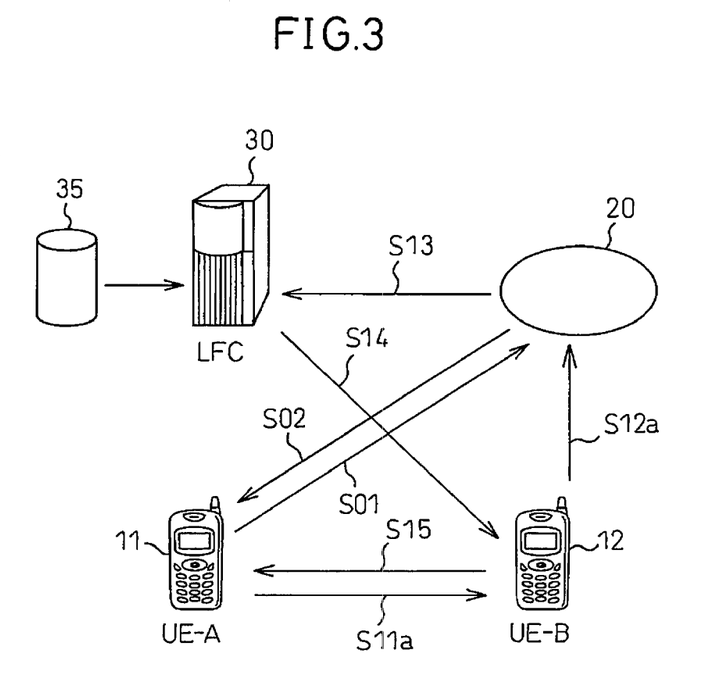
FIG. 3 is a view explaining a second embodiment of the present invention.
Figure 4:
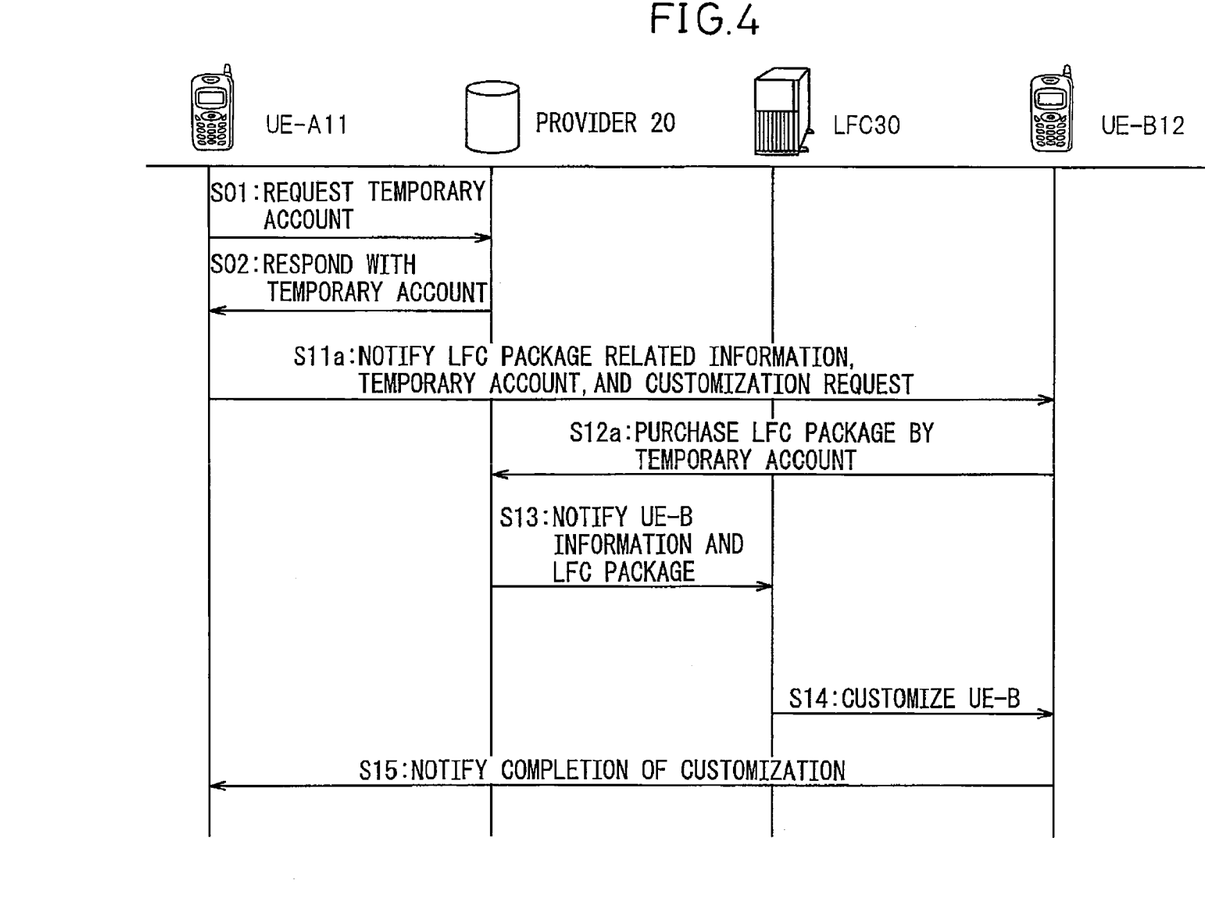
FIG. 4 is a view explaining the flow of operation of the second embodiment of the present invention.

FIG. 3 is a view explaining another embodiment of a customization system. FIG. 4 is a view explaining the flow of operation of the system shown in FIG. 3. Elements similar to the embodiment described in FIGS. 1 and 2 are assigned similar reference notations.

The network of FIG. 3 includes a contents provider 20 selling LFC packages for customization of terminals, and an LFC service functional unit 30 customizing terminals based on the sold LFC packages. Further, when the contents provider 20 does not hold the LFC package, an external server 35 holding the LFC package can be used in the same way as in the embodiment shown in FIGS. 1 and 2.

In the system shown in FIG. 3, the terminal UE-A11 obtains a temporary account from the contents provider 20 before the terminal UE-A11 requests customization of the terminal UE-B12. Further, when the terminal UE-A11 requests customization of the terminal UE-B12, the terminal UE-A11 notifies this temporary account and enables use of the temporary account to access the contents provider 20.

Referring to FIG. 4, at step S01, the terminal UE-A11 requests to the contents provider 20 a temporary account for purchasing an LFC package. To request a temporary account, the information sent from the terminal UE-A11 to the contents provider 20 includes the address information of the user of the terminal UE-A11 requesting the temporary account, and the address information of the user of the terminal UE-B12 using the temporary account.

The temporary account which the terminal UE-A11 requests not only has to enable the terminal UE-B12 to access the contents provider 20, but also has to enable the terminal UE-B12 to acquire the LCF package designated by the terminal UE-A11. The account which is usually used by the user of the terminal UE-A11 is not used when the user wants to customize the terminal UE-B12, so as to prevent other LFC package from being purchased and acquired for purposes or at a timing other than the request from the terminal UE-A11.

At step S02, the contents provider 20 sends the terminal UE-A11 the temporary account. The content of this temporary account is, for example, an ID, password, expiration date, or number of times that the use of the temporary account is permitted.

Next, at step S11a, the terminal UE-A11 notifies the terminal UE-B12 the address information of the terminal UE-A11 making the request, LCF package related information relating to LCF package that is the customization content, the acquired temporary account, and the customization request. The LCF package related information includes URL of contents provider, LFC package identifier, etc.

At step S12a, the terminal UE-B12 accesses the contents provider 20 by using the notified temporary account. That is, the terminal UE-B12 notifies the temporary account and the LFC package identifier and terminal UE-B12 address information to the contents provider 20, and purchases the LFC package to be acquired notified from the terminal UE-A11.

Below, steps S13 to S15 are similar to the steps explained in the embodiment shown in FIGS. 1 and 2. That is, at step S13, the contents provider 20 sends the LFC package purchased for the LFC service functional unit 30 or LFC package acquisition information and the address information of the terminal UE-B to the LFC service functional unit 30. The LFC service functional unit 30 which received the LFC package acquisition information acquires the LFC package from the external server 35.

At step S14, the LFC service functional unit 30 customizes the terminal UE-B21 based on the LFC package. When the customization is completed, as shown in step S15, the terminal UE-B12 sends the terminal UE-A11 a customization completion notification.

Even when the terminal UE-B12 cannot be customized as instructed by the terminal UE-A11 requesting the customization at the embodiment shown in FIGS. 1 and 2, customization is possible in the embodiment described above.

That is, even when the terminal UE-B12 is not a subscriber of the contents provider 20, the terminal UE-A11 sends the temporary account of the contents provider to the terminal UE-B12, so the designated LFC package can be purchased by the terminal UE-B12.

Further, the terminal UE-A11 acquires a temporary account. Therefore, the terminal UE-B12 is not charged and customization of the terminal UE-B12 is possible without a burden being placed on the user of the terminal UE-B12.

Further, even when the contents provider 20 is a contents server 20 connected to an inhouse network and the terminal UE-B12 does not have the right of access to the contents server 20, the terminal UE-A11 sends the right of access as a temporary account to the terminal UE-B12, so the terminal UE-B12 can reliably access the contents server.

According to the next embodiment, the problem (P3) described above can be solved.

When the terminal UE-A11 holds customization contents such as wallpaper, sound effects, applications for customization of the other terminal as an LCF package, it may be considered to use the customization package held by the terminal UE-A11. That is, when the user of the terminal UE-A11 is thinking of customizing the other terminal UE-B12, rather than having the terminal UE-A11 notify the terminal UE-B12 of the LFC package related information and request customization, the terminal UE-A11 may notify the terminal UE-B12 the LFC package itself, and request the customization of the terminal UE-B12. In this case, the customization of the terminal UE-B12 is performed without going through the contents provider 20 and LFC functional unit 30. Note that this is predicated on the terminal UE-A11 having the right to notify the LFC package to the other terminal.

However, in this case:

(P5) In an environment of a wireless cell where bandwidth cannot be sufficiently obtained, it is impractical to transfer a large sized file like an LFC package between terminals. In particular, when there are several terminals to be customized, the terminal UE-A11 issuing the customization request to the other terminals would consume a lot of resources, or a long time would be expended for completion of customization of all of the terminals covered.

(P6) When the customization is not performed through the LFC functional unit 30, the terminal UE-A11 sending the LFC package to the other terminals and requesting customization requires functions equivalent to the LFC functional unit or part of its functions. New development costs would be incurred and much waste would be caused.

(P7) When the terminal UE-A11 does not mount functions equivalent to the LFC functional unit 30, the terminal UE-B12 requires a dedicated functional unit for customization and, again, there would be much waste from the viewpoint of development costs etc.

To solve the problems (P6) and (P7), it may be considered to have the terminal UE-A11 notify the LFC functional unit the LFC package, the customization terminal information, and a customization request that the terminal UE-A11 holds, and have the LFC functional unit customize the other terminals. However, the terminal UE-A11 sends the LFC package itself to the LFC functional unit. As shown in the above (P5), transferring large sized files between terminals is not practical. In particular, when there are several terminals to be customized, a lot of resources would be expended or a long time would be required until completion of customization.

In this case, this is predicated on the terminal UE-A11 having the right to notify the LFC package to the other terminal.

The next embodiment is to solve the problems of the above (P1) to (P7).

Figure 5:
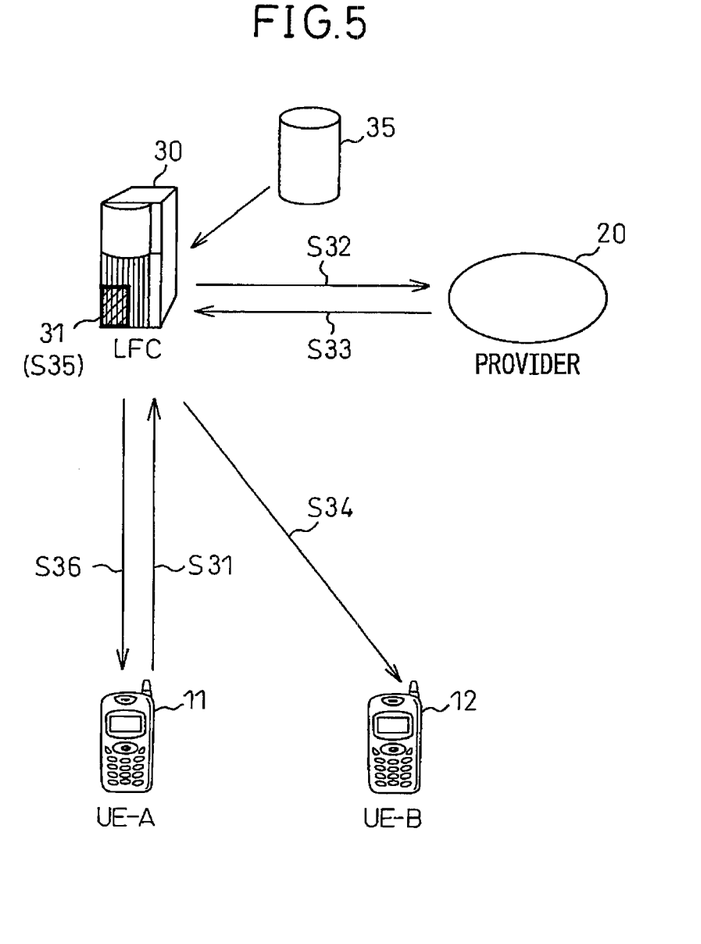
FIG. 5 is a view explaining a third embodiment of the present invention.
Figure 6:
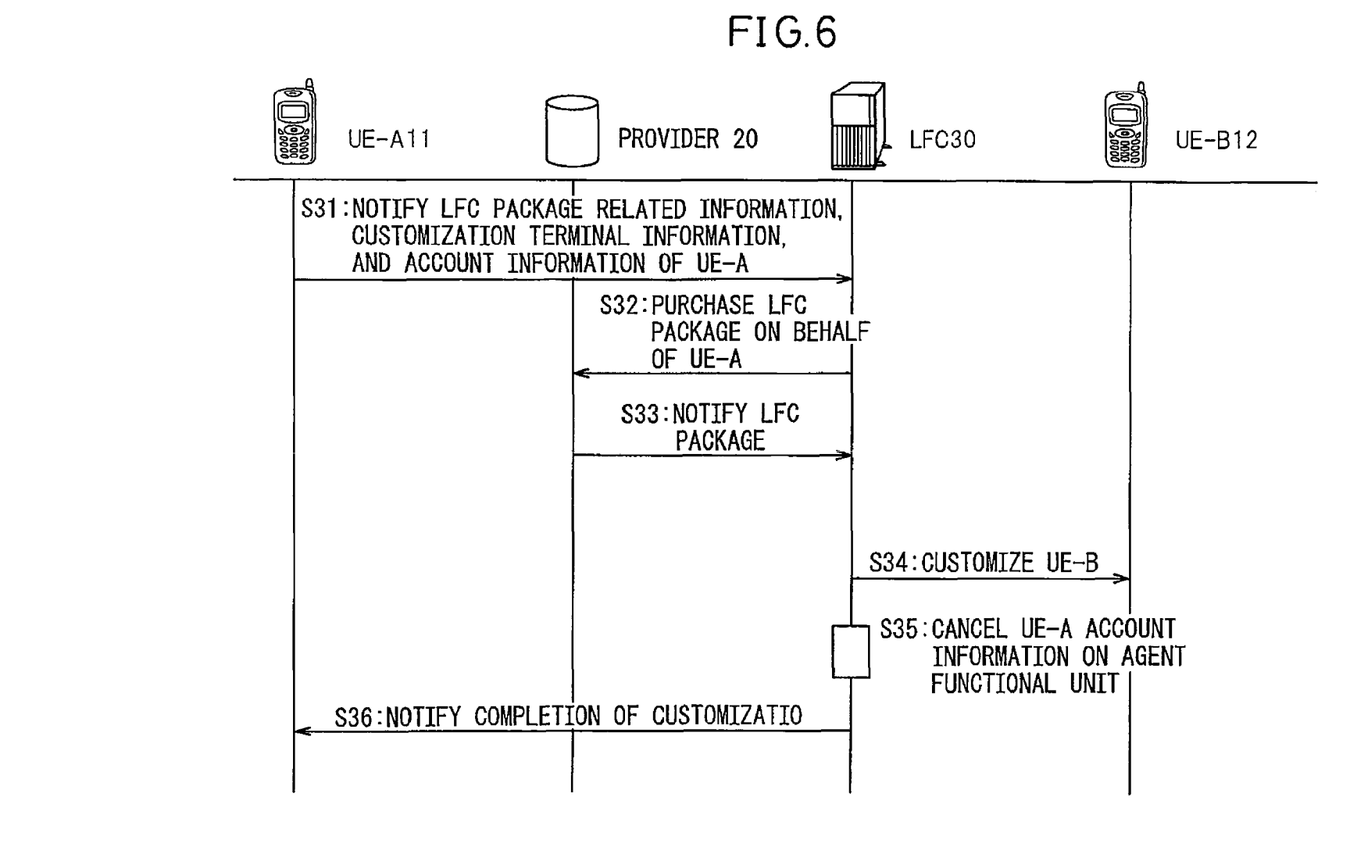
FIG. 6 is a view explaining the flow of operation of the third embodiment of the present invention.

FIG. 5 is a view for explaining the other embodiment, while FIG. 6 is a view for explaining the flow of operation of the embodiment shown in FIG. 5.

FIG. 5 shows a terminal UE-A11 owned by one user, a terminal UE-B12 owned by another user, a contents provider 20 selling contents data for customization of a terminal as an LFC package, and an LFC service functional unit 30 for customization of a terminal. The contents provider 20 need not be a provider selling contents for customization, but may be a contents server 20 for providing contents for customization. For example, it may be a contents server connected to an inhouse network and enabling authorized terminals to download contents for customization free of charge.

In this embodiment, the user of the terminal UE-A11 does not notify the terminal UE-B12 to be customized of the request for customization, but notifies the LFC service functional unit 30. Further, the user of the terminal UE-A11 notifies the contents related information and the account information for the contents provider to the LFC service functional unit 30. Due to this, the LFC service functional unit 30 forms an agent functional unit 31 operating as an agent for the requesting user requesting the customization of a terminal. This agent functional unit 31 purchases the LFC package as an agent by the account of the requesting user, that is, the account of the user of the terminal UE-A11. The account information of the requesting user used for the purchase as an agent is cancelled or erased from the agent functional unit after the completion of the customization of the terminal.

The flow of operation of this embodiment will be explained with reference to FIGS. 5 and 6. At steps similar to those of the embodiments described above, the explanations will sometimes be simplified.

At step S31, the terminal UE-A11 notifies to the LFC service functional unit 30 the customization terminal information designating the terminal to be customized, the LFC package related information including the URL of the contents provider 20 providing the LFC package and the LFC package identifier for identifying the LFC package, and the account information of the user of the terminal UE-A11 that is enabled to access to the contents provider 20 and to acquire the LFC package, along with the customization request.

As a result, a user agent functional unit 31 that acts as an agent of the terminal UE-A11 is formed in the LFC service functional unit 30 notified the account of the user of the terminal UE-A11. At step S32, the user agent functional unit 31 uses the account information of the user of the terminal UE-A11 to access the contents provider 20, and purchase the LFC package required for customization of the terminal.

At step S33, the contents provider 20 notifies the LFC package purchased by the user agent functional unit 31 to the LFC service functional unit 30. The contents provider 20 need not send the LFC package to the LFC service functional unit 30, but may send the LFC package acquisition information. In this case, the LFC service functional unit 30 uses the LFC package acquisition information to access the external server 35 holding the purchased LFC package and downloads the LFC package.

At step S34, the LFC service functional unit 30 sends commands for customizing the terminal UE-B12 to the terminal UE-B12.

When the customization of the terminal UE-B12 is completed, at step S35, the account information of the terminal UE-A11 requesting the customization held by the terminal agent functional unit 31 is cancelled, that is, is deleted. At step S36, the LFC service functional unit 30 sends a customization completion notice and account cancellation notice to the terminal UE-A11.

In this embodiment, the account information of the user requesting the customization request is notified to the LFC service functional unit 30 and a user agent functional unit is formed, so a large file size of information as pointed out in (P5) is not transferred.

The embodiment shown in FIGS. 5 and 6 cleared several problems. However, when there are a plurality of terminals to be customized, performing the operation of step S31 for each of the plurality of terminals would be very wasteful in terms of resources. Therefore, it may be possible to write all addresses of the plurality of terminals to be customized in the information notified at step S31. However, this would result in ballooning of the amount of information written.

In the next embodiment, a plurality of terminals to be customized shall be grouped together. A unique representative address is set for that group, and the representative address is written in the information to be notified. It is sufficient that this group be formed before the customization request. The method of forming the group is not important. The user requesting the customization of the terminals may form the group. For example, the group may be a group formed corresponding to an organization in a company or may be an existing group such as an SNS (Social Networking Service).

Figure 7:
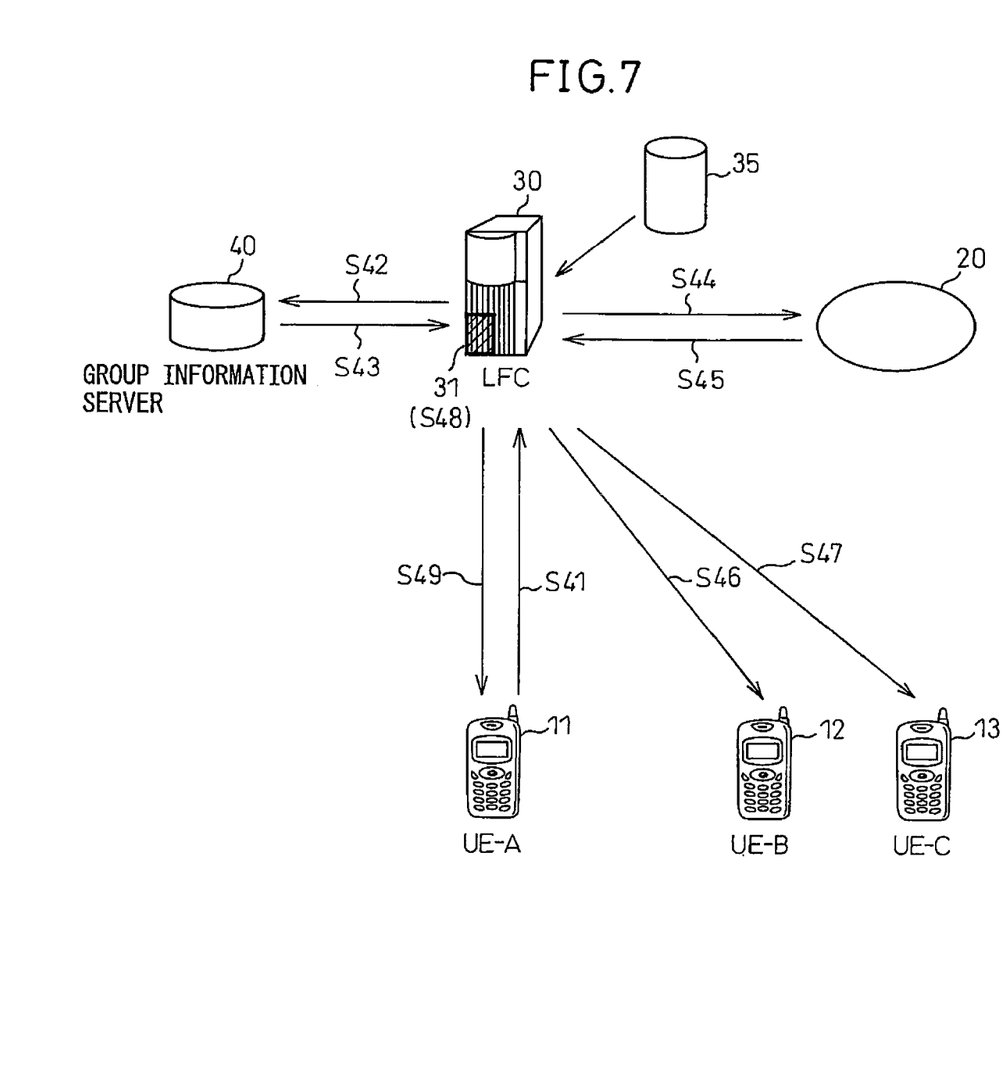
FIG. 7 is a view explaining a fourth embodiment of the present invention.

FIG. 7 is a view for explaining an outline of the network system of this embodiment. This network system comprising a group information storage server 40 storing information on a group comprised of a plurality of customization objects. The group information storage server stores at least unique addresses of all of the terminals belonging to the group, and a representative address representing this group. To facilitate the explanation of this embodiment, only two terminals to be customized UE-B12 and UE-C13 are described. However, this embodiment is further effective in the case where there are a large number of terminals to be customized. Note that the terminal UE-A11 of the user requesting the customization, the contents provider 20 selling the LFC package, the LFC service functional unit 30 customizing the terminals, the external server 35 storing LFC packages if necessary, etc. are similar to those of the embodiment shown in FIGS. 5 and 6.

Figure 8:
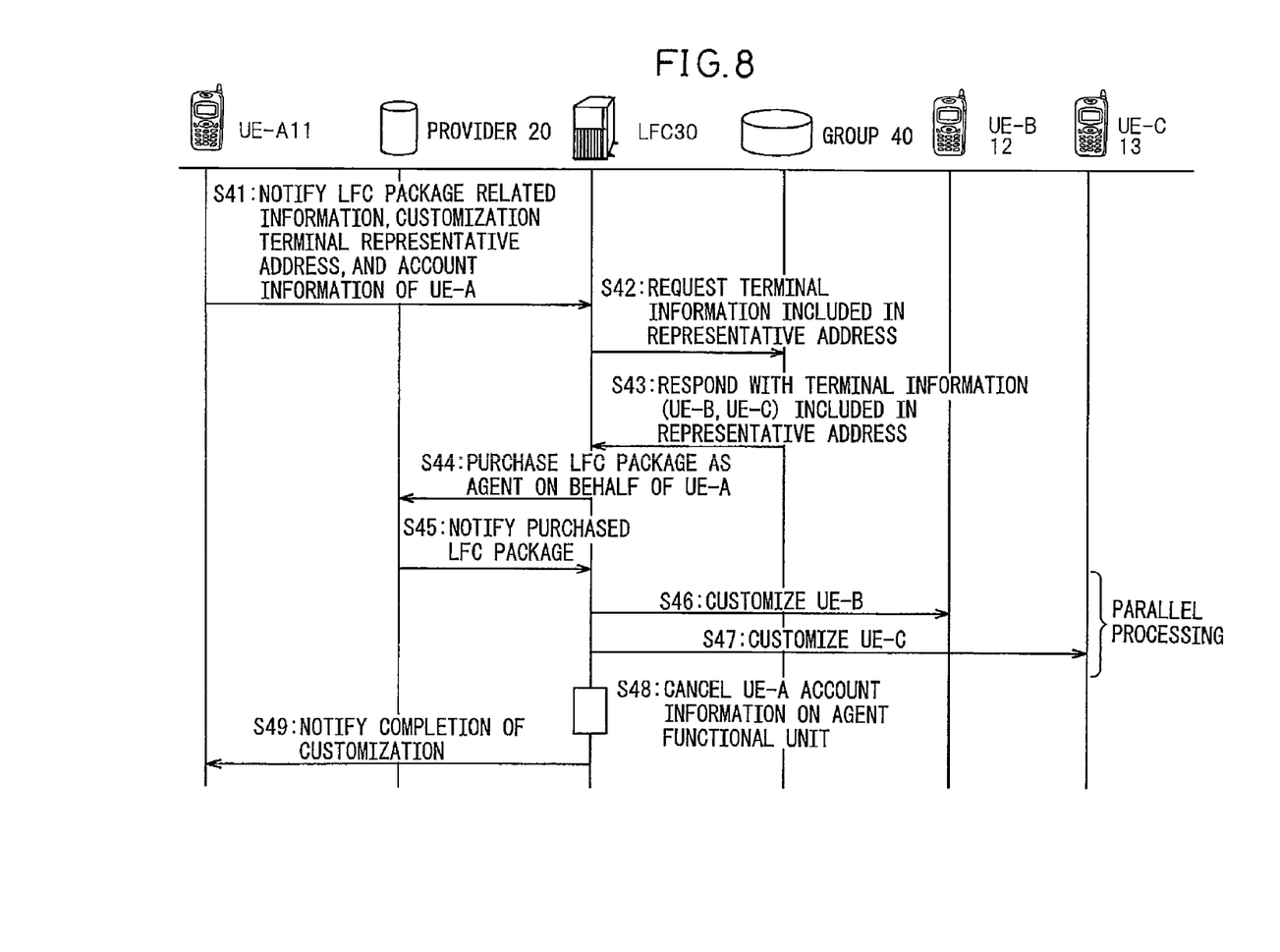
FIG. 8 is a view explaining the flow of operation of the fourth embodiment of the present invention.

Below, the flow of operation of the embodiment shown in FIG. 7 will be explained referring to the FIG. 8. At step S41, the terminal UE-A11 notifies the LFC package related information for accessing the customizing contents, the account information of the terminal UE-A11 able to acquire the customizing contents, and group information showing a representative address including the addresses of all terminals to be customized along with the request for customization to the LFC service functional unit 30.

At step S42, the LFC service functional unit 30 inquires to the group information storage server 40 the representative address notified from the terminal UE-A11. That is, the LFC service functional unit 30 requests the unique addresse corresponding to all of the terminals belonging to the group designated by the representative address.

At step S43, the group information storage server 40 returns to the LFC service functional unit 30 the unique addresses of all terminals included in the representative addresses.

At step 44, the LFC service functional unit 30 uses the terminal agent functional unit 31 acting as the agent of the terminal UE-A11 to access the contents provider 20 by the account information of the terminal UE-A11, and purchases the LFC package.

At step S45, the contents provider 20 notifies the LFC package which the terminal agent functional unit 31 purchased to the LFC service functional unit. The contents provider 20 may also notify the LFC service functional unit 30 of the LFC package acquisition information. In this case, the LFC service functional unit 30 accesses the external server 35 holding the purchased LFC package and downloads the package.

At steps S46 and S47, the LFC service functional unit 30 customizes the terminal UE-B12 and terminal UE-C13 in parallel. When the customization of the terminal UE-B12 and terminal UE-C13 ends, at step S48, the account information of the terminal UE-A11 requesting the customization held by the terminal agent functional unit 31 is cancelled, that is, deleted. After this, at step S49, the LFC service functional unit 30 sends a notice of completion of customization of the terminal UE-B12 and terminal UE-C13 and a notification of cancellation of account to the terminal UE-A11.

In the fourth embodiment, when requesting customization for a plurality of terminals, it is possible to notify just a representative address of the group of the plurality of terminals to customize a plurality of terminals, so it is possible to prevent enlargement of the size of the notification message.

While the invention has been described with reference to specific embodiments chosen for purpose of illustration, it should be apparent that numerous modifications could be made thereto by those skilled in the art without departing from the basic concept and scope of the invention.

What is claimed is:

1. A network system comprising:
    a first terminal;
    a second terminal communicating with the first terminal;
    a contents management server managing contents for customization of a terminal; and
    a customization service unit customizing the terminal based on contents for customization notified from the contents management server; wherein
    the first terminal obtains a temporary account from the contents management server and then notifies the second terminal of a request for customizing the second terminal with information for designating contents for customization in the contents management server and information for accessing the contents management server, the information for accessing the contents management server includes information of the temporary account, and
    the second terminal receives the customization request from the first terminal, accesses the contents management server using the temporary account to obtain the designated contents for customization from the contents management server, and is customized through the customization service unit based on the obtained contents for customization, wherein
    the designated contents are identified using at least one of a URL which identifies a contents provider selling or managing the designated contents and a designated contents identifier used to identify and acquire the designated contents used for customization.

2. The network system as set forth in claim 1, wherein the temporary account is fixed in at least one of an expiration date of the temporary account and number of uses of the temporary account that permitted.

3. A network system comprising:
    a contents management server managing contents for customization of a terminal;
    a customization service unit customizing the terminal based on contents for customization notified from the contents management server; and
    a first terminal notifying the customization service unit of customization request for a second terminal with information for designating contents for customization in the contents management server and address information of a second terminal, the information for designating contents including at least one of a URL which identifies a contents provider selling or managing the designated contents and a designated contents identifier used to identify and acquire the designated contents used for customization;

wherein the customization service unit obtains the designated contents for customization from the contents management server and customizes the second terminal based on the obtained contents for customization.

4. The network system as set forth in claim 3, wherein the first terminal further notifies of account information of a user of the first terminal, and enabling the customization service unit to use the account information to access the contents management server.

5. The network system as set forth in claim 3, wherein the second terminal belongs to a group, the address information is an address of the group and the customization service unit customizes all terminals of the group in parallel.

6. A terminal customization method in a network system that comprises a contents management server managing contents for customization of a terminal and a customization service unit customizing the terminal based on contents for customization notified from the contents management server, the terminal customization method comprising:

obtaining, by a first terminal, a temporary account from the contents management server;

notifying, by the first terminal after the temporary account is obtained, a second terminal of a request for customizing the second terminal with information for designating contents for customization in the contents management server and information for accessing the contents management server, the information for accessing the contents management server includes information of the temporary account;

receiving, by the second terminal, the customization request from the first terminal;

accessing the contents management server using the temporary account, by the second terminal, to obtain the designated contents for customization from the contents management server, the designated contents being identified using the designated contents are identified using at least one of a URL which identifies a contents provider selling or managing the designated contents and a designated contents identifier used to identify and acquire the designated contents used for customization; and customizing, by the customization service unit, the second terminal based on the obtained contents for customization.

7. The terminal customization method as set forth in claim 6, wherein the temporary account is fixed in at least one of an expiration date of the temporary account and number of uses of the temporary account that permitted.

8. A terminal customization method in a network system that comprises a contents management server managing contents for customization of a terminal and a customization service unit customizing the terminal based on contents for customization notified from the contents management server, the terminal customization method comprising:

notifying, by a first terminal, the customization service unit of customization request a second terminal with information designating contents for customization in the contents management server and address information of the second terminal, the information for designating contents including at least one of a URL which identifies a contents provider selling or managing the designated contents and a designated contents identifier used to identify and acquire the designated contents used for customization;

obtaining, by the customization service unit, the designated contents for customization from the contents management server; and customizing, by the customization service unit, the second terminal based on the obtained contents for customization.

9. The terminal customization method as set forth in claim 8, wherein the notifying comprises notifying of account information of a user of the first terminal, for enabling the customization service unit to use the account information to access the contents management server.

10. The terminal customization method as set forth in claim 8, wherein the second terminal belongs to a group, the address information is an address of the group and the customization service unit customizes all terminals of the group in parallel.

11. A method for forming a terminal agent in a customization service apparatus performing a customization service of a terminal connected to a network based on contents for customization, the method comprising:

receiving, by the customization service apparatus, from a first terminal requesting customization of a second terminal, information designating the contents for customization of the second terminal, terminal information identifying the second terminal, and account information of a user of the first terminal to acquire the contents for customization; and forming, by the customization service apparatus, a terminal agent functioning as an agent of the first terminal in the customization service apparatus, the terminal agent obtaining the contents for customization customizing the second terminal, wherein the information designating contents including at least one of a URL which identifies a contents provider selling or managing the designated contents and a designated contents identifier used to identify and acquire the designated contents used for customization.

12. The method as set forth in claim 11, wherein the terminal agent is canceled by erasing the account information of the user after the second terminal finishes being customized.

* * * * *